United States Patent
Herder

(10) Patent No.: US 9,911,342 B2
(45) Date of Patent: Mar. 6, 2018

(54) AIRCRAFT WAKE TURBULENCE AWARENESS

(71) Applicant: L-3 Communication Avionics Systems, Inc., Grand Rapids, MI (US)

(72) Inventor: Andrew J. Herder, Caledonia, MI (US)

(73) Assignee: L3 Commmunications Avionics Systems, Inc., Grand Rapids, MI (US)

( * ) Notice: Subject to any disclaimer, the term of this patent is extended or adjusted under 35 U.S.C. 154(b) by 7 days.

(21) Appl. No.: 15/146,230

(22) Filed: May 4, 2016

(65) Prior Publication Data
US 2016/0328981 A1 Nov. 10, 2016

Related U.S. Application Data

(60) Provisional application No. 62/158,340, filed on May 7, 2015.

(51) Int. Cl.
  G08G 5/00 (2006.01)
  B64D 43/00 (2006.01)
  B64D 45/00 (2006.01)

(52) U.S. Cl.
  CPC .......... *G08G 5/0078* (2013.01); *B64D 43/00* (2013.01); *B64D 45/00* (2013.01); *G08G 5/0008* (2013.01);
  (Continued)

(58) Field of Classification Search
  CPC ............ B64C 43/00; B64C 45/00; G08G 5/00
  See application file for complete search history.

(56) References Cited

U.S. PATENT DOCUMENTS

| 5,179,377 | A | 1/1993 | Hancock |
| 6,177,888 | B1 | 1/2001 | Cabot et al. |

(Continued)

FOREIGN PATENT DOCUMENTS

WO 200071985 A1 11/2000

OTHER PUBLICATIONS

International Search Report (Form PCT/ISA/210) and Written Opinion of the International Searching Authority (Form PCT/ISA/237) from corresponding Patent Cooperation Treaty Application No. PCT/IB2016/052580, dated Sep. 2, 2016.

*Primary Examiner* — Yonel Beaulieu
(74) *Attorney, Agent, or Firm* — Gardner, Linn, Burkhart & Ondersma, LLP

(57) ABSTRACT

An avionics wake turbulence awareness system and method for use in an aircraft includes an ADS-B receiver that is adapted to be positioned in an equipped aircraft and receives ADS-B transmissions from other aircraft. A control system is responsive to the ADS-B receiver and determines an identity for each of the other aircraft and determines a movement of each of the other aircraft relative to the equipped aircraft. The control system determines a flight path history of each of the other aircraft from their respective identities and movements relative to the equipped aircraft. An output device is responsive to the control system to provide guidance to a pilot of the equipped aircraft to avoid an encounter with a wake turbulence caution area that is defined by a flight path history of another aircraft. The control system evaluates the relative risk of the equipped aircraft encountering the respective wake turbulence caution areas of each of the other aircraft, and after selecting an aircraft of the other aircraft with a highest priority, provides guidance to the pilot of the equipped aircraft to avoid an (Continued)

encounter with a wake turbulence caution area of the selected aircraft.

22 Claims, 6 Drawing Sheets

(52) U.S. Cl.
CPC ......... *G08G 5/0021* (2013.01); *G08G 5/0091* (2013.01)

(56) References Cited

U.S. PATENT DOCUMENTS

| | | | |
|---|---|---|---|
| 6,683,541 B2 | 1/2004 | Staggs et al. | |
| 6,703,945 B2 | 3/2004 | Kuntman et al. | |
| 6,963,291 B2 | 11/2005 | Holforty et al. | |
| 7,411,519 B1 | 8/2008 | Kuntman et al. | |
| 8,219,264 B1 | 7/2012 | Blake | |
| 8,306,677 B2 * | 11/2012 | Deker | G08G 5/0008 340/964 |
| 8,736,465 B2 | 5/2014 | Rutherford et al. | |
| 8,949,014 B2 | 2/2015 | Bateman et al. | |
| 9,037,319 B2 | 5/2015 | Conner et al. | |
| 9,075,074 B2 * | 7/2015 | Fischenberg | G01P 5/001 |
| 9,285,472 B2 | 3/2016 | Getson et al. | |
| 9,310,222 B1 * | 4/2016 | Suiter | G01C 23/005 |
| 2002/0154061 A1 | 10/2002 | Frazier, Jr. et al. | |
| 2004/0104824 A1 | 6/2004 | Cole et al. | |
| 2007/0260366 A1 | 11/2007 | Lacaze et al. | |
| 2010/0283635 A1 | 11/2010 | Brinkman et al. | |
| 2011/0066362 A1 | 3/2011 | He | |
| 2011/0270473 A1 | 11/2011 | Reynolds et al. | |
| 2012/0095623 A1 | 4/2012 | Barral et al. | |
| 2014/0039785 A1 | 2/2014 | Bateman et al. | |
| 2014/0136110 A1 | 5/2014 | Nykl et al. | |
| 2015/0045994 A1 | 2/2015 | Krishna et al. | |

* cited by examiner

AIRCRAFT WAKE TURBULENCE AWARENESS

CROSS-REFERENCE TO RELATED APPLICATIONS

This application claims priority from U.S. provisional patent application Ser. No. 62/158,340, filed on May 7, 2015, the disclosure of which is hereby incorporated herein by reference in its entirety.

BACKGROUND OF THE INVENTION

The present invention is directed to an aircraft avionic system and method, and in particular, to a system and method for an equipped aircraft to avoid a potential wake turbulence generated by another aircraft.

While wake turbulence can be a threat to safety of any aircraft, it is particularly dangerous for medium to small aircraft. Such wake turbulence is particularly dangerous immediately before landings and immediately after takeoffs. The task of avoiding potential wake turbulences of other aircraft is made more difficult when a pilot of an aircraft is forced to monitor the position and flight path history of multiple other aircraft.

SUMMARY OF THE INVENTION

The present invention provides awareness to a pilot of a risk posed by wake turbulence of other aircraft. Moreover, the present invention may be implemented as a system that is based upon information that is readily available from avionic systems of even small aircraft to provide awareness of a risk of encountering such wake turbulence. The invention is based upon a recognition that it is difficult for a pilot to visually estimate the distance of another aircraft and/or the time it may take to reach the flight path of that aircraft and any accompanying potential wake turbulence. As a result of such inaccuracy, it is possible for the pilot to encounter a wake turbulence even when the pilot estimates that the aircraft is sufficiently spaced from another aircraft. ADS-B systems are becoming popular in aircraft of all sizes and will soon be required on most aircraft systems. ADS-B systems receive transmissions from other aircraft in the form of an 8 character field that consists of either a flight identifier for a commercial airliner or a tail number for general aviation aircraft, as well as the relative position of the identified aircraft with respect to the equipped aircraft. With such information, the control system of the equipped aircraft creates a flight path history for each aircraft in its vicinity. Wake turbulence caution areas that follow each of those other aircraft are defined by their aircraft type and follow the respective bread crumbs of the their respective flight path histories. In other words, this wake turbulence caution area may be modified to account for lead aircraft type, typical wake vortex, descent rate, reported winds, and the like. By tracking the flight path history of an intruding aircraft, the system of the equipped aircraft can provide a visual and/or aural advisory to the pilot of a potential wake turbulence associated with the intruding aircraft. The system can also report to the pilot the time and distance from the lead aircraft which will aid the pilot in keeping appropriate spacing from the lead aircraft.

An avionics wake turbulence awareness system and method for use in an aircraft, according to an aspect of the invention, includes an ADS-B receiver that is adapted to be positioned in an equipped aircraft and receives ADS-B transmissions from other aircraft. A control system is responsive to the ADS-B receiver and determines a respective identity of each of the other aircraft and their respective movements relative to the equipped aircraft. The control system determines a flight path history for each of the other aircraft from their respective identities and movements relative to the equipped aircraft. An output device is responsive to the control system to provide guidance to a pilot of the equipped aircraft to avoid an encounter with a wake turbulence caution area that is defined by a flight path history of another aircraft.

The guidance provided may include distance and flight time to the other aircraft. The flight time is based upon the ground speed of the other aircraft. The guidance may also include an indication that the equipped aircraft is at risk of encountering the potential wake turbulence of the at least one other aircraft. A pilot notification device may be provided that is responsive to the guidance in order to alert a pilot that the equipped aircraft is at risk of encountering the wake turbulence caution area of another aircraft. The notification device may include a display that is adapted to provide a visual indication that the equipped aircraft is at risk of encountering the wake turbulence caution area of the other aircraft. The visual indication may include an icon adjacent a depiction of the other aircraft on the display. The visual indication may include a chevron trailing the depiction of the other aircraft on the display. The visual indication may include a display of distance and flight time to the other aircraft. The notification device may also include an aural announcement via a speaker or pilot's headset that the equipped aircraft is at risk of encountering the wake turbulence caution area of the other aircraft.

The avionic notification may include a visual indication of the flight path history of the other aircraft. The control system may be capable of determining flight path histories of each of the other aircraft and evaluating the relative risk of the equipped aircraft encountering the respective wake turbulence caution areas of each of the other aircraft. After selecting an aircraft of the other aircraft with a highest priority, guidance is provided to the pilot of the equipped aircraft to avoid an encounter with a wake turbulence caution area of the selected aircraft. The control system may evaluate and prioritize the other aircraft according to category types, such that other aircraft smaller than the equipped aircraft have a lower priority.

These and other objects, advantages, and features of this invention will become apparent upon review of the following specification in conjunction with the drawings.

DESCRIPTION OF THE PREFERRED EMBODIMENT

Figure 1:
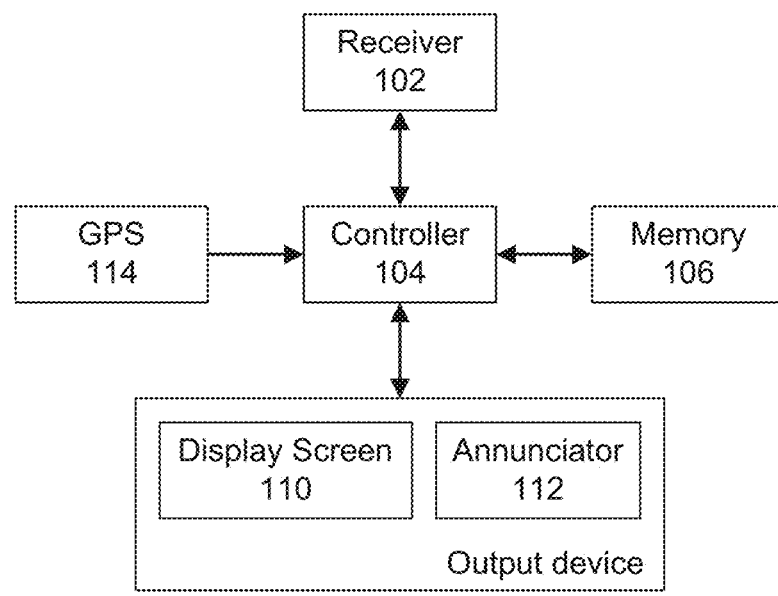
FIG. 1 is an exemplary block diagram of an avionics wake turbulence awareness system in accordance with an embodiment of the present disclosure.

Referring now to the drawings and the illustrative embodiments depicted therein, an avionics wake turbulence awareness system for use in an aircraft is disclosed. FIG. 1 illustrates an exemplary avionics wake turbulence awareness system 100. As discussed herein, a receiver 102 of the wake turbulence awareness system 100 may be an ADS-B receive that is capable of receiving ADS-B transmissions from other aircraft. The transmission be in the form of an 8-character field that consists of either a flight identifier for a commercial airliner or a tail number for a general aviation aircraft, as well as the relative position of the identified aircraft with respect to the equipped aircraft. The wake turbulence awareness system 100 includes a control system 104 (also known herein as a controller 104) that is responsive to the ADS-B receiver 102 in order to receive transmissions from other aircraft. The wake turbulence awareness system 100 may include any form of ADS-B receiver 102 and accompanying controller 104, and may be of the type disclosed in commonly assigned U.S. Pat. No. 9,285,472 of Blake R. Getson et al., entitled MULTI-LINK TRANSPONDER FOR AIRCRAFT AND METHOD OF PROVIDING MULTI-LINK TRANSPONDER CAPABILITY TO AN AIRCRAFT HAVING AN EXISTING TRANSPONDER, the disclosure of which is hereby incorporated herein by reference in its entirety. As also discussed herein, and described in detail in commonly owned U.S. Pat. No. 8,736,465 issued to Steve M. Rutherford et al., entitled "AIRCRAFT TRAFFIC DISPLAY," the disclosure of which is hereby incorporated herein by reference, ADS-B signals are received by the ADS-B receiver 102, and the controller 104 accessing a database in a memory 106, looks up specific aircraft information based upon a received ICAO code contained within the ADS-B transmission. As illustrated in FIG. 1, the wake turbulence awareness system 100 also includes an output device 108, which comprises a visual display screen 110. The output device 108 may also optionally include an annunciator 112. The annunciator 112 may be implemented as one or more speakers in the aircraft and via a pilot's aural headset. The output device 108 is responsive to the control system 104 to provide guidance to a pilot of the equipped aircraft to avoid encounters with potential wake turbulences of other aircraft.

Figure 2:
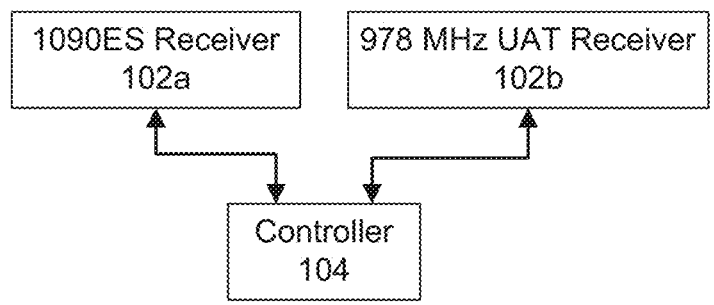
FIG. 2 is an exemplary block diagram of an ADS-B receiver and controller of the avionics wake turbulence awareness system illustrated in FIG. 1, in accordance with an embodiment of the present disclosure.

FIG. 2 illustrates that the ADS-B receiver 102 of FIG. 1 may comprise a 1090 ES receiver 102a and/or a 978 MHz UAT receiver 102b. As illustrated in FIG. 2, either of the 1090 ES receiver 102a and the 978 MHz UAT receiver 102b forwards the received ADS-B transmissions to the controller 104 for processing.

Figure 3:
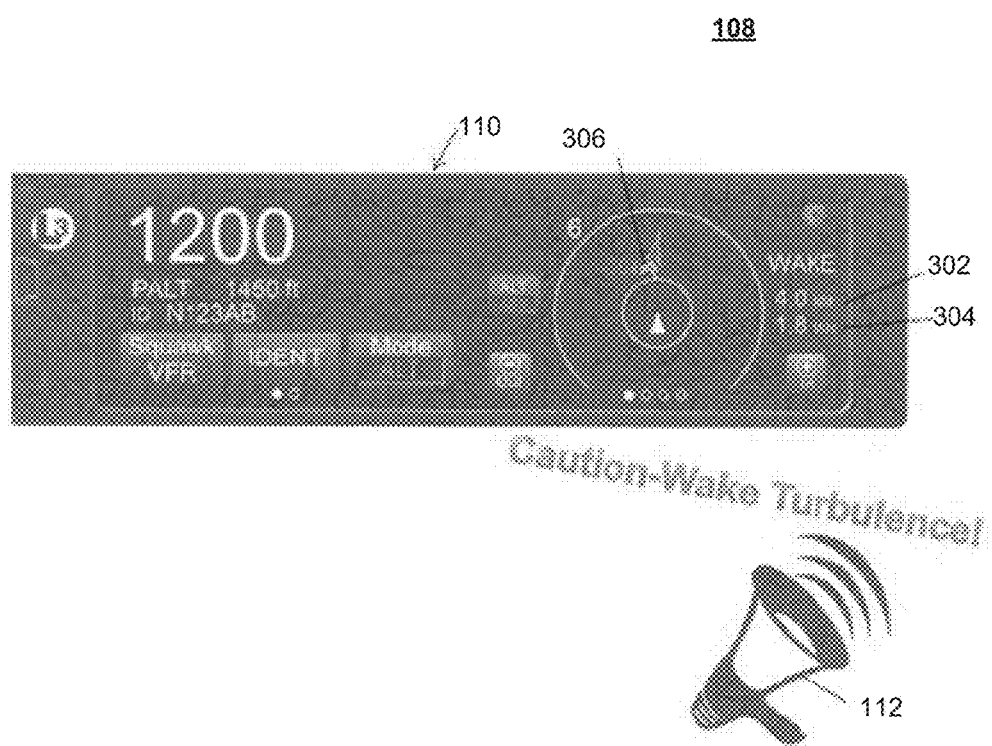
FIG. 3 is an exemplary output device of the avionics wake turbulence awareness system illustrated in FIG. 1, in accordance with an embodiment of the present disclosure.
Figure 6A:
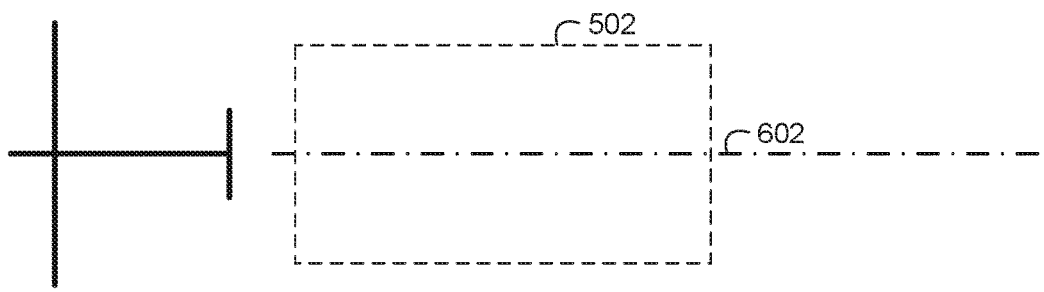
FIGS. 6A and 6B illustrate the exemplary wake caution areas of FIGS. 5A and 5B that follow flight path histories in accordance with an embodiment of the present disclosure.
Figure 6B:
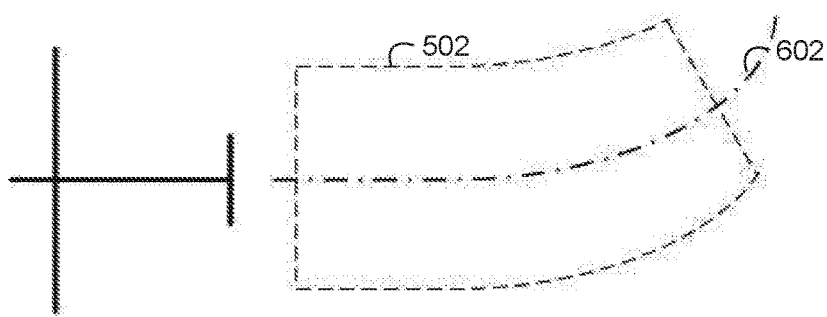

FIG. 3 illustrates an exemplary output device 108 that incorporates a display screen 110 and an annunciator 112. The guidance may include a visual distance indication 302 indicating a distance in nautical miles to another aircraft. The guidance may include a time indication 304 advising the pilot of an estimated time behind the other aircraft or to the potential wake encounter computed at least in part from the ADS-B system. The guidance may include a visual indication 306 that the equipped aircraft is at risk of encountering the wake turbulence caution area of the other aircraft. In an aspect of the present invention, an icon 306 is used as a visual indication 306. As illustrated in FIG. 3, the icon 306 may be placed adjacent a depiction of the other aircraft on the display 110. The icon 306 may take other forms, but is shown as a chevron trailing the depiction of the other aircraft on the display 110. As discussed below, and illustrated in FIGS. 6A and 6B, the icon 306 may be paired with a visual depiction of the flight path history 602 of the other aircraft in order to give the pilot a better understanding of the form of potential wake turbulences that should be avoided. As illustrated in FIGS. 6A and 6B, and discussed herein, such visual indication of the flight path 602 of the other aircraft may be in the form of dotted "bread crumbs" or other intuitive indications of the flight path history 602 of the other aircraft.

As illustrated in FIGS. 1 and 3, the output device 108 may include an aural annunciator 112 that verbally notifies the pilot via an aural announcement that the equipped aircraft is at risk of encountering the wake turbulence caution area of the other aircraft.

Figure 4:
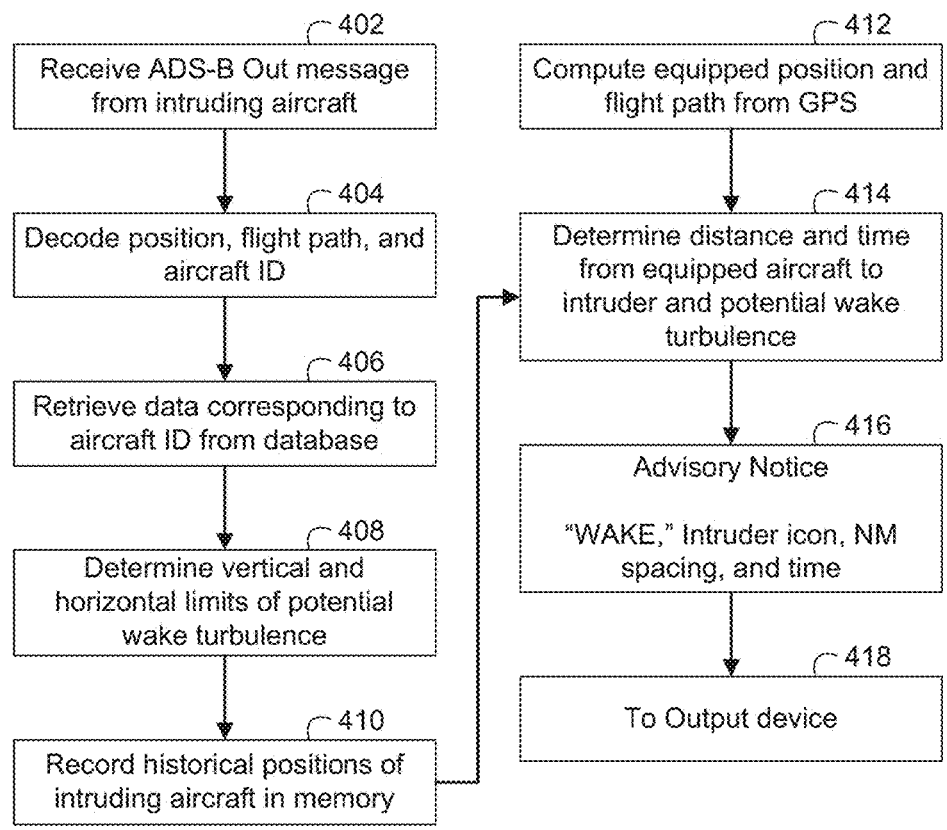
FIG. 4 is a flow diagram of the steps to a computer-implemented method for wake turbulence awareness in an aircraft, in accordance with an embodiment of the present disclosure.

FIG. 4 illustrates the exemplary steps to a computer-implemented method for providing guidance to a pilot of an equipped aircraft that the equipped aircraft is at risk of encountering a wake turbulence caution area of another aircraft. In step 402 of FIG. 4, an ADS-B Out message is received from an intruding aircraft. As used herein, an "intruding aircraft" is merely another aircraft leading the equipped aircraft that occupies the same general airspace as the equipped aircraft. Such an intruding aircraft has a potential wake turbulence that the equipped aircraft may need to avoid. In step 404 of FIG. 4, the received ADS-B Out message is decoded to determine position, flight path, and aircraft ID of the intruding aircraft. In step 406 of FIG. 4, data corresponding to the aircraft ID is retrieved from the database in the memory 106 based upon the determined aircraft ID.

In step 408 of FIG. 4, vertical and horizontal limits of a wake turbulence caution area are determined based upon the determined aircraft type, speed, and flight path. As discussed herein, a wake turbulence caution area may be defined with regards to its length, height, and width. For example, the defined length may be three minutes in length, based upon the intruding aircraft's ground speed, a height or vertical dimension may be a thousand feet in height, while a width or horizontal dimension may also be a thousand feet in width. As discussed herein, the vertical and horizontal dimensions are variable based upon the intruding aircraft's category type. For example, larger aircraft types define larger horizontal and vertical dimensions. In step 410 of FIG. 4, historical positions of the intruding aircraft are recorded in the memory 106. Such recorded positions may be used, as discussed herein, to define the location of any potential wake vortex/turbulence.

In step 412 of FIG. 4, the equipped aircraft's position and flight path are computed based upon positioning data received from a global positioning system (GPS) receiver 114 in the equipped aircraft. As illustrated in FIG. 1, based upon signals received from orbiting GPS satellites, the GPS receiver 114 determines the position of the equipped aircraft and transmits the positioning data to the controller 104. In step 414 of FIG. 4, based upon the recorded historical positions of the intruding aircraft (i.e., a flight path history), and the computed position and flight path of the equipped aircraft, a distance and time from the equipped aircraft to the intruder and its associated wake turbulence caution area is determined. As discussed herein, once a location and flight history of the intruder aircraft is determined, the wake turbulence caution area may be defined.

In steps 416 and 418 of FIG. 4, if the controller 104 determines that the equipped aircraft is at risk of entering the wake turbulence caution area associated with the intruder aircraft, a wake advisory will be transmitted to the output device 108. In step 418 of FIG. 4, a visual wake advisory is displayed in the display screen 110 and an audible wake advisory is announced in the annunciator 112. As illustrated in FIG. 3, the text box "WAKE," the icon 306 (e.g., chevrons), a determined nautical mile range 302 to the potential wake vortex/turbulence, and a determined time 304 to enter the wake turbulence caution area will be displayed on the display screen 110. In an aspect of the present invention, if the equipped aircraft's flight path will enter the area of potential wake vortex/turbulence, or violate a recommended spacing between aircraft, the controller will indicate the above wake vortex/turbulence caution thirty seconds prior. As illustrated in FIGS. 1 and 3, when the WAKE caution is initiated, one or more of the visual display screen 110 and the annunciator 112 of the output device 108 will visually and/or audibly indicate the wake advisory, respectively.

The avionic wake turbulence awareness system 100 may receive ADS-B transmissions from multiple aircraft within the vicinity of the equipped aircraft. It is possible that more than one of these multiple aircraft may have a flight path history that indicates that there is a potential wake turbulence risk to the equipped aircraft. In an aspect of the present invention, the controller 104 may utilize a prioritization scheme that is capable of determining among the flight path histories of the multiple other aircraft, which of the multiple other aircraft creates a greatest risk of the equipped aircraft encountering the potential wake turbulence of that aircraft. The controller 104 may then provide guidance to the pilot of the equipped aircraft to avoid a potential encounter with the highest risk potential wake turbulence. Thus, the visual indication 306 may be displayed at only one aircraft depiction, and the distance 302 and time of separation 304 for only that intruding aircraft, even though multiple aircraft depictions may be displayed on the display screen 110. This prioritization scheme avoids the pilot needing to make a choice as to which intruding aircraft needs to be avoided in order to take the least risky route.

In an aspect of the present invention, the avionic wake turbulence awareness system 100 may utilize a hierarchy to prioritize advisories, select a highest threat intruder, and suppress advisories for much smaller aircraft that would not create a significant wake vortex/turbulence as compared to the equipped aircraft. The tables below (Tables I & II) are an exemplary aircraft assignment for a six category system, as proposed by the Federal Aviation Administration (FAA). The list is not all-inclusive. As illustrated in Table I, aircraft models are categorized according to size, from Category A (the largest) to Category F (the smallest). Table II illustrates how the necessary separation between aircraft can vary according to the varying sizes of the leader aircraft and the follower aircraft. The minimum separation increases with the size ratio between the leading aircraft and the trailing aircraft. The minimum radar separation (MRS) is a variable minimum horizontal separation required between radar controlled aircraft, based upon their range from the controlling radar. For example, the MRS may be 3-8 nautical miles. The minimum required separation may be greater than the MRS, such as when the following aircraft type is smaller than the leading aircraft type.

TABLE I

| Category A | Category B | Category C | Category D | Category E | Category F |
| --- | --- | --- | --- | --- | --- |
| A380 | B747 series | MD11 | B757 series | AT72 | E120 |
| AN-225 | A340 series | B767 | B737 series | RJ100 | B190 |
| End of list | B777 series | A306 | A320 series | RJ85 | C650 |
| | A330 series | A310 | B727 series | B463 | H25B |
| | B787 series | DC8 | MD80 series | B462 | C525 |
| | C-5 | DC10 | F50 | E170 | GA multi-engine aircraft |
| | B-52 | C-17 | E190 | CRJ1/2 | GA single engine aircraft |
| | IL-96 | C-135 | B717 | CRJ7/9 | |
| | | B-1 | GLF5 | AT45 | |
| | | B-2 | DC95 | AT43 | |
| | | | DC93 | GLF4 | |
| | | | DH8D | SF34 | |
| | | | F100 | DH8A/B/C | |
| | | | F70 | E135/145 | |

TABLE II

| | | Follower (Nautical Mile) | | | | | |
| --- | --- | --- | --- | --- | --- | --- | --- |
| | | A | B | C | D | E | F |
| Leader | A | MRS | 5 | 6 | 7 | 7 | 8 |
| | B | MRS | 3 | 4 | 5 | 5 | 7 |
| | C | MRS | MRS | MRS | 3.5 | 3.5 | 6 |
| | D | MRS | MRS | MRS | MRS | MRS | 5 |
| | E | MRS | MRS | MRS | MRS | MRS | 4 |
| | F | MRS | MRS | MRS | MRS | MRS | MRS |

NOTE:
MRS: Minimum Radar Separation.

Figure 5A:
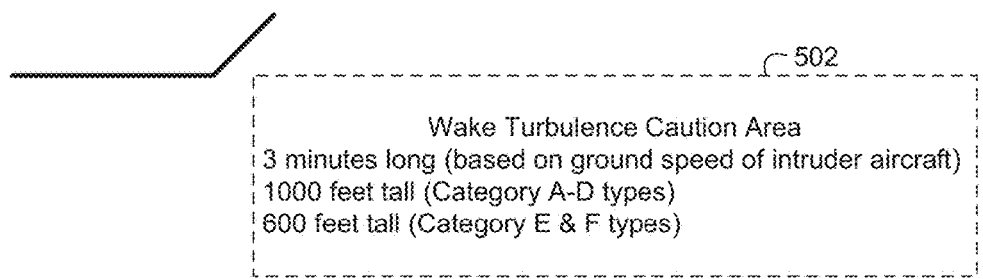
FIGS. 5A and 5B illustrate exemplary wake caution areas defining the boundaries of potential wake turbulences in accordance with an embodiment of the present disclosure.
Figure 5B:
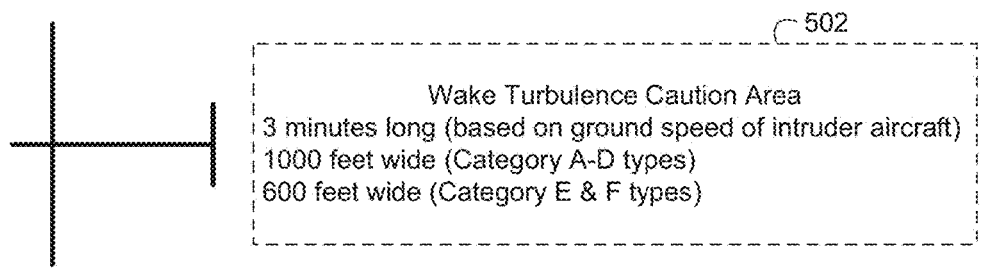

FIGS. 5A and 5B illustrate exemplary wake turbulence caution areas 502 and how the dimensions of the wake turbulence caution area 502 are defined by the type of intruder/leading aircraft and related information. As illustrated in FIG. 5A, an exemplary wake turbulence caution area 502 may be three minutes in length, based upon the ground speed of the intruder/leading aircraft. The exemplary wake caution area's vertical dimension, extending below the altitude of the intruder/leading aircraft, may be a notional 1000 feet for category A-D types, and a notional 600 feet for category E & F types. As illustrated in FIG. 5A, the wake caution area 502 extends below the intruder/leading aircraft because a wake turbulence may drift down over time. As illustrated in FIG. 5B, the wake turbulence caution area's exemplary width may also vary according to category type. For example, the width may also be a notional 1000 feet for category A-D types, and a notional 600 feet for category E & F types. As noted herein, the exemplary length, width, and height values are notional, and other dimensions based on category types are anticipated.

FIGS. 6A and 6B illustrate exemplary wake turbulence caution areas 502 that are shaped to follow the flight path histories 602 of the intruder/leading aircraft. In other words, a wake turbulence caution area's dimensions will conform to the path of a flight path history as it moves in three dimensions.

Thus, embodiments of the present invention are capable of improving safety by providing quantitative separation information for a flight operation that is typically performed visually using the pilot's judgement. In addition, the system provides awareness to a developing or potential wake turbulence encounter that may not be readily apparent to the pilot, such as crossing flight paths that may occur during any phase of the flight. This may be accomplished because the flight paths of both aircraft may be known from the controller 104 that is responsive to the ADS-B receiver 102.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An avionics wake turbulence awareness system for use in an aircraft, the system comprising:
   an ADS-B receiver adapted to be positioned in an equipped aircraft and operable to receive ADS-B transmissions from a plurality of other aircrafts;
   a control system, responsive to the ADS-B receiver, that determines an identity for each of the plurality of other aircrafts and determines a movement of each of the plurality of other aircrafts relative to the equipped aircraft;
   the control system determines a flight path history of each of the plurality of other aircrafts from their respective identities and movements relative to the equipped aircraft; and
   an output device, responsive to the control system, that provides guidance to a pilot of the equipped aircraft to avoid an encounter with a wake turbulence caution area that is defined by a flight path history of a selected aircraft of the plurality of other aircrafts; and
   wherein the control system evaluates the relative risk of the equipped aircraft encountering respective wake turbulence caution areas of each of the plurality of other aircrafts, and after selecting an aircraft of the plurality of other aircrafts with a highest priority based upon the evaluation of the respective wake turbulence caution areas, provides guidance to the pilot of the equipped aircraft to avoid an encounter with a wake turbulence caution area of the selected aircraft.

2. The avionics wake turbulence awareness system as claimed in claim 1, wherein the guidance comprises distance and flight time to the selected aircraft.

3. The avionic wake turbulence awareness system as claimed in claim 1, wherein the guidance includes an indication that the equipped aircraft is at risk of encountering the wake turbulence caution area of the selected aircraft.

4. The avionic wake turbulence awareness system as claimed in claim 3 including a pilot notification device that is responsive to the guidance in order to alert a pilot that the equipped aircraft is at risk of encountering the wake turbulence caution area of the selected aircraft.

5. The avionic wake turbulence awareness system as claimed in claim 4, wherein the notification device comprises a display, the display adapted to provide a visual indication that the equipped aircraft is at risk of encountering the wake turbulence caution area of the selected aircraft.

6. The avionic wake turbulence awareness system as claimed in claim 5, wherein the visual indication is an icon adjacent a depiction of the selected aircraft on the display.

7. The avionic wake turbulence awareness system as claimed in claim 5, wherein the visual indication comprises a chevron trailing the depiction of the selected aircraft on the display.

8. The avionic wake turbulence awareness system as claimed in claim 5, wherein the visual indication includes a display of distance and flight time to the selected aircraft.

9. The avionic wake turbulence awareness system as claimed in claim 5, wherein the notification comprises a visual indication of the flight path history of the selected aircraft.

10. The avionic wake turbulence awareness system as claimed in claim 5, wherein the notification device comprises an indication in the form of an aural announcement that the equipped aircraft is at risk of encountering the wake turbulence caution area of the selected aircraft.

11. An avionics wake turbulence awareness system for use in an aircraft, the system comprising:
    an ADS-B receiver adapted to be positioned in an equipped aircraft and operable to receive ADS-B transmissions from one or more other aircrafts;
    a control system, responsive to the ADS-B receiver, that determines an identity for each of the one or more other aircrafts and determines a movement of each of the one or more other aircrafts relative to the equipped aircraft;
    the control system determines a flight path history of each of the one or more other aircrafts from their respective identities and movements relative to the equipped aircraft; and
    an output device, responsive to the control system, that provides guidance to a pilot of the equipped aircraft to avoid an encounter with a wake turbulence caution area that is defined by a flight path history of another aircraft of the one or more other aircrafts; and
    wherein the control system evaluates the relative risk of the equipped aircraft encountering respective wake turbulence caution areas of each of the one or more other aircrafts, and after selecting an aircraft of the one or more other aircrafts with a highest priority, provides guidance to the pilot of the equipped aircraft to avoid an encounter with a wake turbulence caution area of the selected aircraft, and wherein the control system evaluates the risk and prioritizes each of the one or more other aircraft by utilizing a hierarchy to prioritize advisories, selecting a highest threat intruder, and suppressing advisories for much smaller aircraft that would not create a significant wake turbulence as compared to the equipped aircraft.

12. A method of wake turbulence awareness in an aircraft, comprising:

receiving ADS-B transmissions from a plurality of other aircrafts with an ADS-B receiver that is positioned in an equipped aircraft;

determining an identity of each of the plurality of other aircrafts and a movement of each of the plurality of other aircrafts relative to the equipped aircraft with the ADS-B system;

determining a flight path history of each of the plurality of other aircrafts from their respective identities and movements relative to the equipped aircraft;

providing guidance to a pilot of the equipped aircraft to avoid an encounter with a wake turbulence caution area that is defined by a flight path history of a selected aircraft of the plurality of other aircrafts; and evaluating the relative risk of the equipped aircraft encountering respective wake turbulence caution areas of each of the plurality of other aircrafts, and after selecting an aircraft of the plurality of other aircrafts with a highest priority based upon the evaluation of the respective wake turbulence caution areas, providing guidance to the pilot of the equipped aircraft to avoid an encounter with a wake turbulence caution area of the selected aircraft.

13. The method of wake turbulence awareness in an aircraft, as claimed in claim 12, wherein the guidance comprises distance and flight time to the selected aircraft.

14. The method of wake turbulence awareness in an aircraft, as claimed in claim 12, wherein the guidance includes indicating that the equipped aircraft is at risk of encountering the wake turbulence caution area of the selected aircraft.

15. The method of wake turbulence awareness in an aircraft, as claimed in claim 14 further comprising, responsive to the guidance, alerting a pilot that the equipped aircraft is at risk of encountering the wake turbulence caution area of the selected aircraft.

16. The method of wake turbulence awareness in an aircraft, as claimed in claim 15 further comprising providing a visual indication that the equipped aircraft is at risk of encountering the wake turbulence caution area of the selected aircraft.

17. The method of wake turbulence awareness in an aircraft, as claimed in claim 16, wherein the visual indication comprises an icon adjacent to a depiction of the selected aircraft on the display.

18. The method of wake turbulence awareness in an aircraft, as claimed in claim 16, wherein the visual indication comprises a chevron trailing the depiction of the selected aircraft on the display.

19. The method of wake turbulence awareness in an aircraft, as claimed in claim 16, wherein the visual indication comprises a display of distance and flight time to the selected aircraft.

20. The method of wake turbulence awareness in an aircraft, as claimed in claim 12 further comprising visually indicating the flight path history of the selected aircraft.

21. The method of wake turbulence awareness in an aircraft, as claimed in claim 15 further comprising indicating in the form of an aural announcement that the equipped aircraft is at risk of encountering the wake turbulence caution area of the selected aircraft.

22. A method of wake turbulence awareness in an aircraft, comprising:

receiving ADS-B transmissions from one or more other aircrafts with an ADS-B receiver that is positioned in an equipped aircraft;

determining an identity of each of the one or more other aircrafts and a movement of each of the one or more other aircrafts relative to the equipped aircraft with the ADS-B system;

determining a flight path history of each of the one or more other aircrafts from their respective identities and movements relative to the equipped aircraft;

providing guidance to a pilot of the equipped aircraft to avoid an encounter with a wake turbulence caution area that is defined by a flight path history of another aircraft; and evaluating the relative risk of the equipped aircraft encountering respective wake turbulence caution areas of each of the one or more other aircrafts, and after selecting an aircraft of the one or more other aircrafts with a highest priority, providing guidance to the pilot of the equipped aircraft to avoid an encounter with a wake turbulence caution area of the selected aircraft, wherein the evaluating the risk and prioritization of each of the one or more other aircrafts comprises utilizing a hierarchy to prioritize advisories, selecting a highest threat intruder, and suppressing advisories for much smaller aircraft that would not create a significant wake turbulence as compared to the equipped aircraft.

* * * * *